United States Patent
Patel et al.

(10) Patent No.: US 10,757,168 B2
(45) Date of Patent: Aug. 25, 2020

(54) MECHANISM FOR EXCHANGING ORDER DATA

(71) Applicant: Verizon Patent and Licensing Inc., Arlington, VA (US)

(72) Inventors: Kiran K. Patel, Wesley Chapel, FL (US); Patricia Grimaldi-Marciano, Randolph, NJ (US); Nicole Elissa Connors, Belle Mead, NJ (US); Radha Sankaran, Basking Ridge, NJ (US)

(73) Assignee: Verizon Patent and Licensing, Inc., Basking Ridge, NJ (US)

( * ) Notice: Subject to any disclaimer, the term of this patent is extended or adjusted under 35 U.S.C. 154(b) by 542 days.

(21) Appl. No.: 14/940,588

(22) Filed: Nov. 13, 2015

(65) Prior Publication Data

US 2017/0142185 A1    May 18, 2017

(51) Int. Cl.
H04L 29/08    (2006.01)

(52) U.S. Cl.
CPC .............. *H04L 67/06* (2013.01); *H04L 67/04* (2013.01); *H04L 67/306* (2013.01)

(58) Field of Classification Search
CPC ............... H04L 67/06; G06F 17/30864; G06F 17/30882
See application file for complete search history.

(56) References Cited

U.S. PATENT DOCUMENTS

| | | | |
|---|---|---|---|
| 2006/0287950 A1* | 12/2006 | Steinberg | G06Q 20/10 705/39 |
| 2011/0250865 A1* | 10/2011 | Breitzman | H04L 12/14 455/406 |
| 2012/0203884 A1* | 8/2012 | von Eicken | H04L 67/00 709/223 |
| 2012/0316941 A1* | 12/2012 | Moshfeghi | G06Q 30/02 705/14.16 |
| 2013/0132854 A1* | 5/2013 | Raleigh | G06F 3/0482 715/738 |
| 2014/0149175 A1* | 5/2014 | Abbott | G06Q 10/0635 705/7.28 |
| 2014/0315516 A1* | 10/2014 | Peng | G06Q 30/00 455/406 |
| 2015/0244784 A1* | 8/2015 | Abe | G01S 5/0263 380/278 |
| 2016/0197773 A1* | 7/2016 | Pandrangi | H04L 41/0803 709/217 |

OTHER PUBLICATIONS

Verizon wireless, Sample Verizon Bill, Retrieved from https://scache.vzw.com/dam/businessportal/content/assets/files/B2B_Streamlined_Bill_Sample.pdf , Oct. 19, 2011, p. 1-9.*
Definition of Euclidean distance, Wikipedia, retrieved Jan. 31, 2019 p. 1-2 (Year: 2019).*

* cited by examiner

*Primary Examiner* — Tonia L Dollinger
*Assistant Examiner* — Joseph M Cousins

(57) ABSTRACT

A request is received from a first user device to identify order data associated with the first user device. Based on receiving the request, an order setting associated with the first user device is identified. The order data is generated based on the order setting of the first user device so that the order data identifies the order setting. The order data is forward to a second user device that differs from the first user device, the second user device can use the order data to copy the order setting associated with the first user device. If the order setting is not available for the second user device, an alternative setting is identified and presented to the second user device.

20 Claims, 10 Drawing Sheets

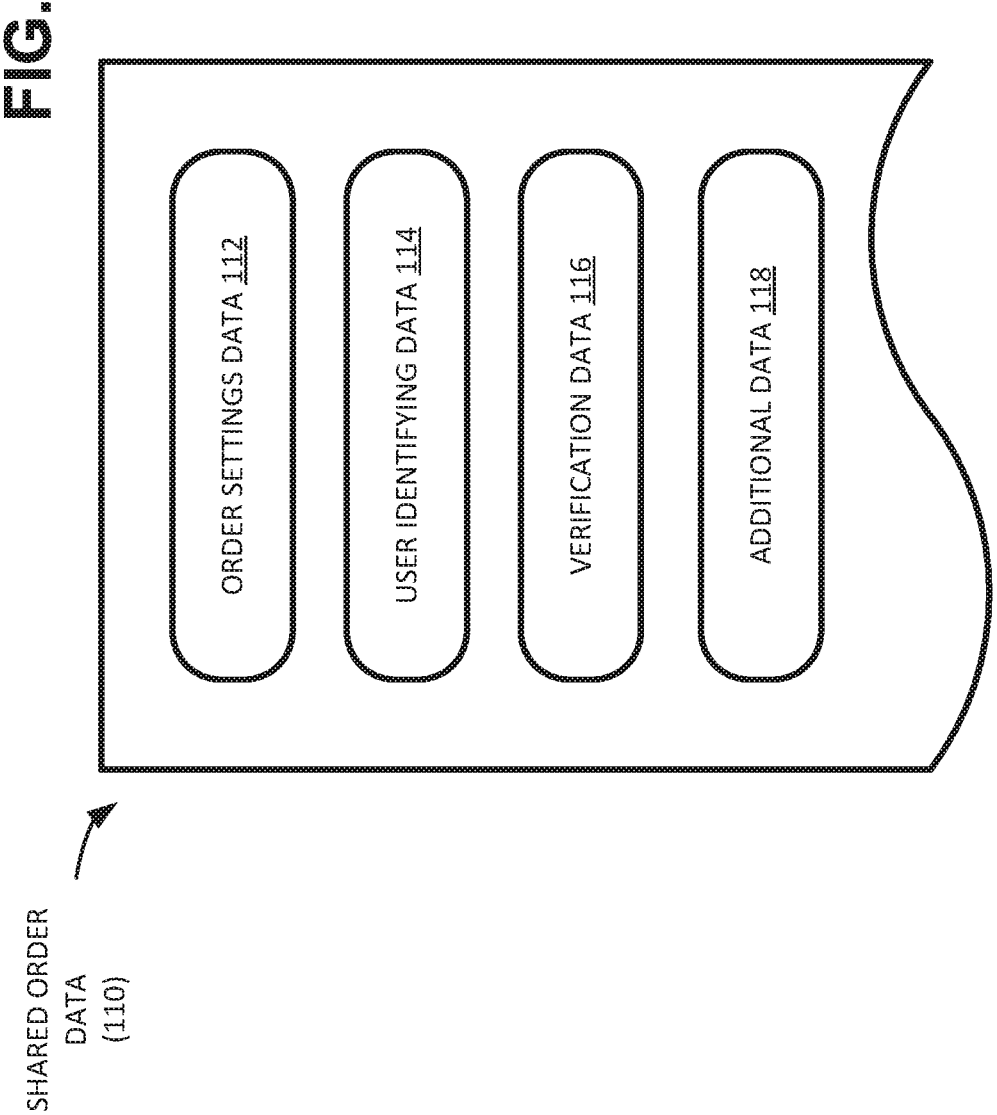

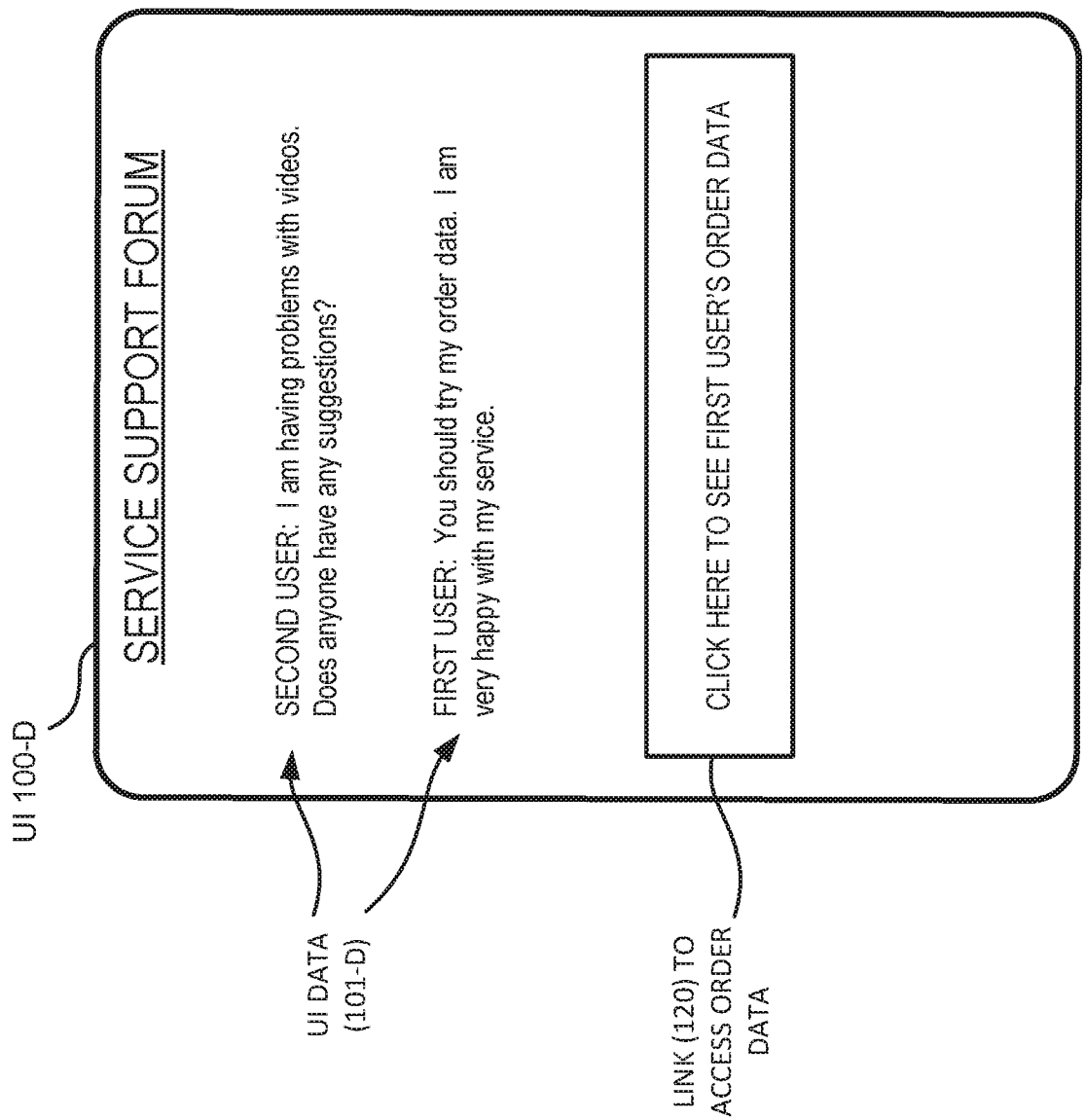

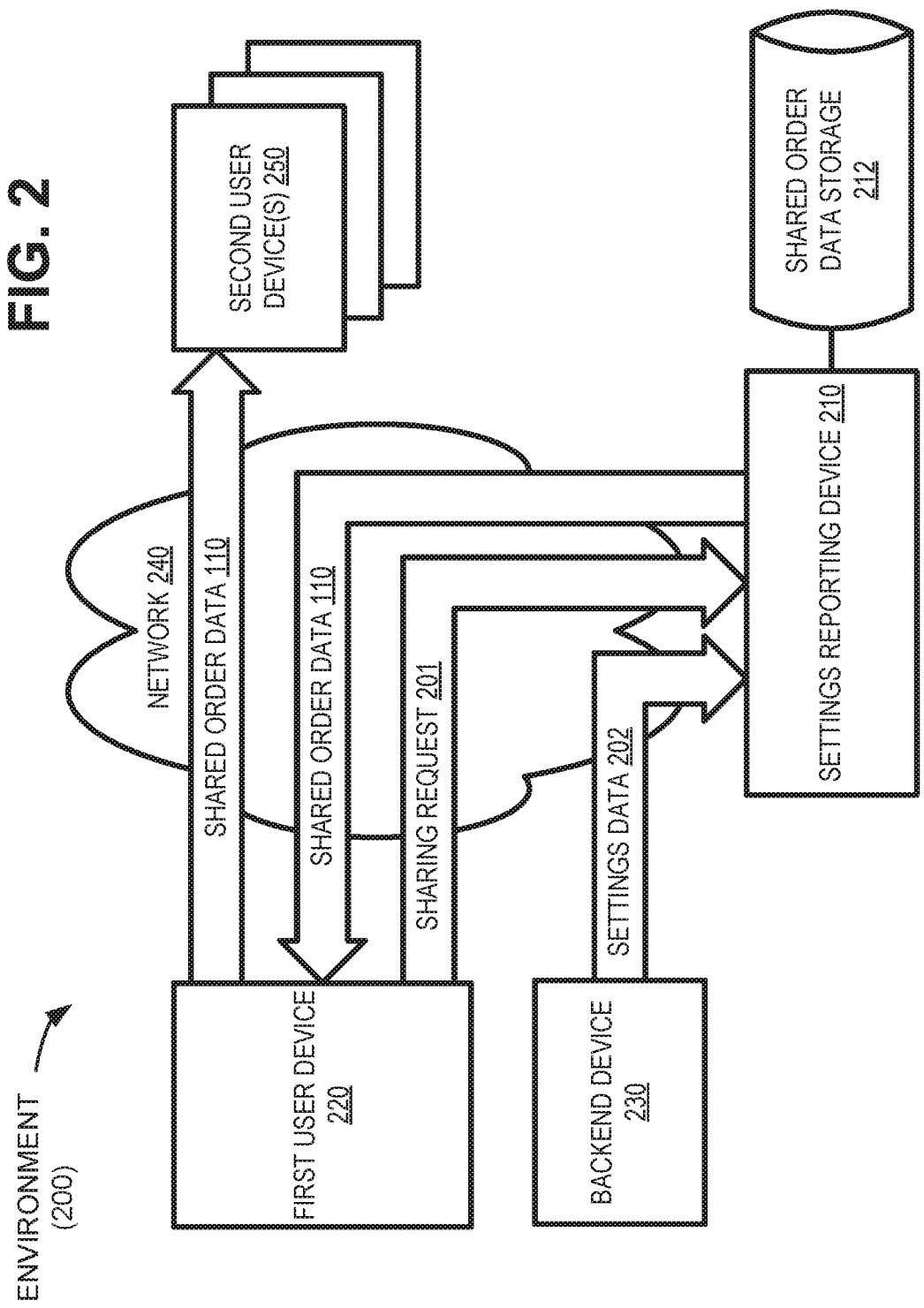

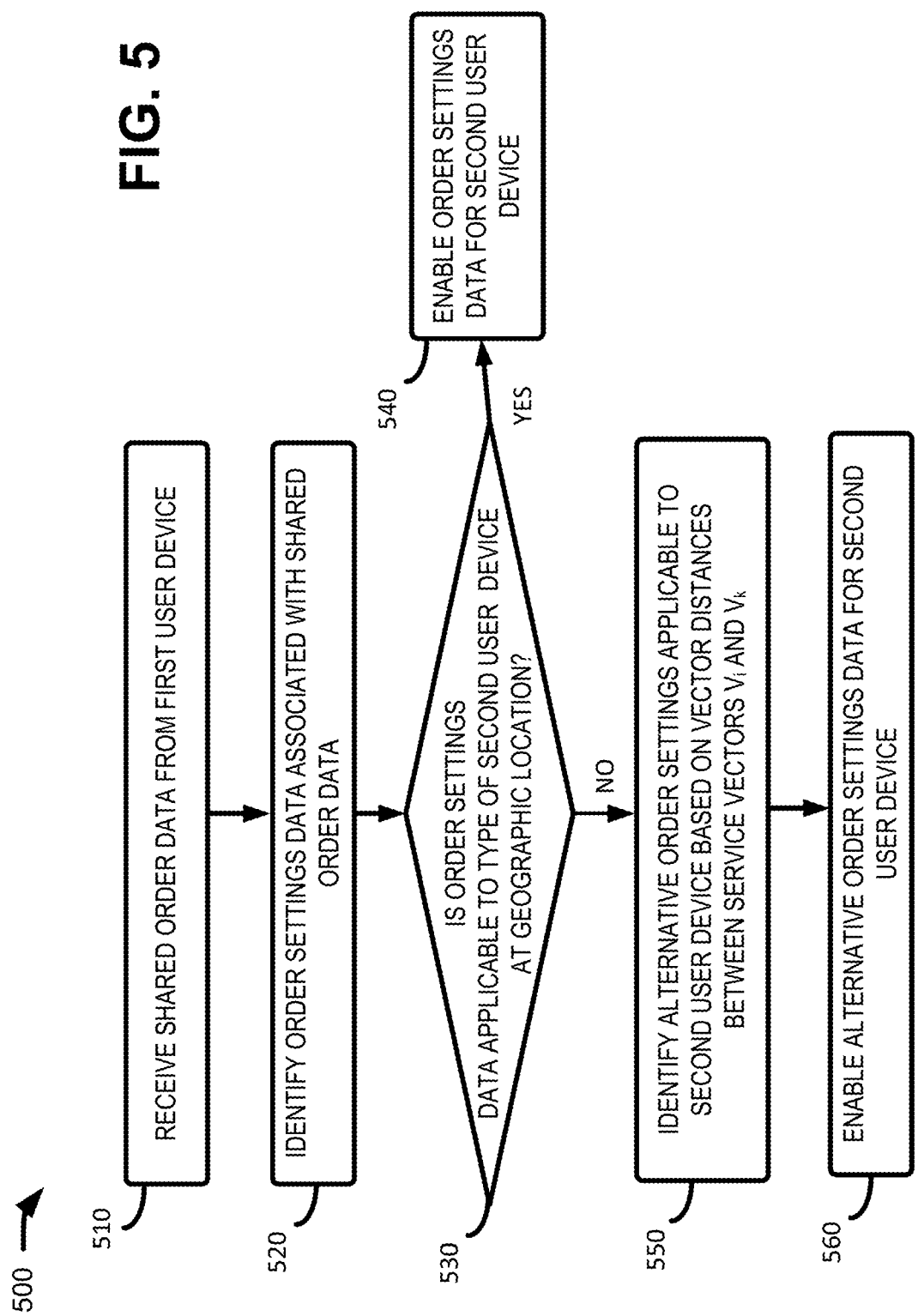

MECHANISM FOR EXCHANGING ORDER DATA

BACKGROUND

A user may have certain order settings related to accessing different telecommunications and/or data services. For example, different order settings may relate to types of data (or content) that may be accessed and/or transmitted by the user, a total amount of data that may be accessed or transmitted by the user during a time period, rates at which the user may access or transmit data, maximum acceptable delays, services offered to the user, etc. The user may request changes in the order settings to achieve desired service characteristics.

BRIEF DESCRIPTION OF THE DRAWINGS

FIGS. 1A and 1C-1F show exemplary portions of a user interface (UI) that may be presented by a user device in certain implementations;

FIG. 1B shows exemplary shared order data that may be generated and distributed in certain implementations;

FIG. 2 shows an exemplary environment in which systems and/or methods described herein may be implemented;

FIG. 5 shows a flow diagram illustrating an exemplary process for modifying order settings based on the shared order data shown in FIG. 1B.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

In certain systems and methods described herein, a user may identify and store data identifying order data associated with the user. For example, the order data may relate to telecommunications and/or data services associated with the user. The user may then share the orders settings by including the order data in a message or otherwise by forwarding the orders settings data to another user. The other user may then use the order data to clone the order settings (e.g., so that the other user can access telecommunications and/or data services using similar settings). In one instance, a user interface (UI) may enable the user to generate the data identifying order settings, enable the user to share the data identifying the order settings with another user, and/or to enable the other user to use the shared order data settings to modify her own order settings.

FIGS. 1A and 1C-1G show exemplary portions of a user interface (UI) 100 (shown in FIGS. 1A and 1C-1F as UIs 100-A and 100-C through 100-F, respectively) that may be presented by a user device in certain implementations. As shown in FIGS. 1A and 1C-1F, UI 100 may include text data 101 (shown in FIGS. 1A and 1C-1F as text data 101-A and 101-C through 101-F, respectively) and one or more graphical elements 102.

Figure 1A:
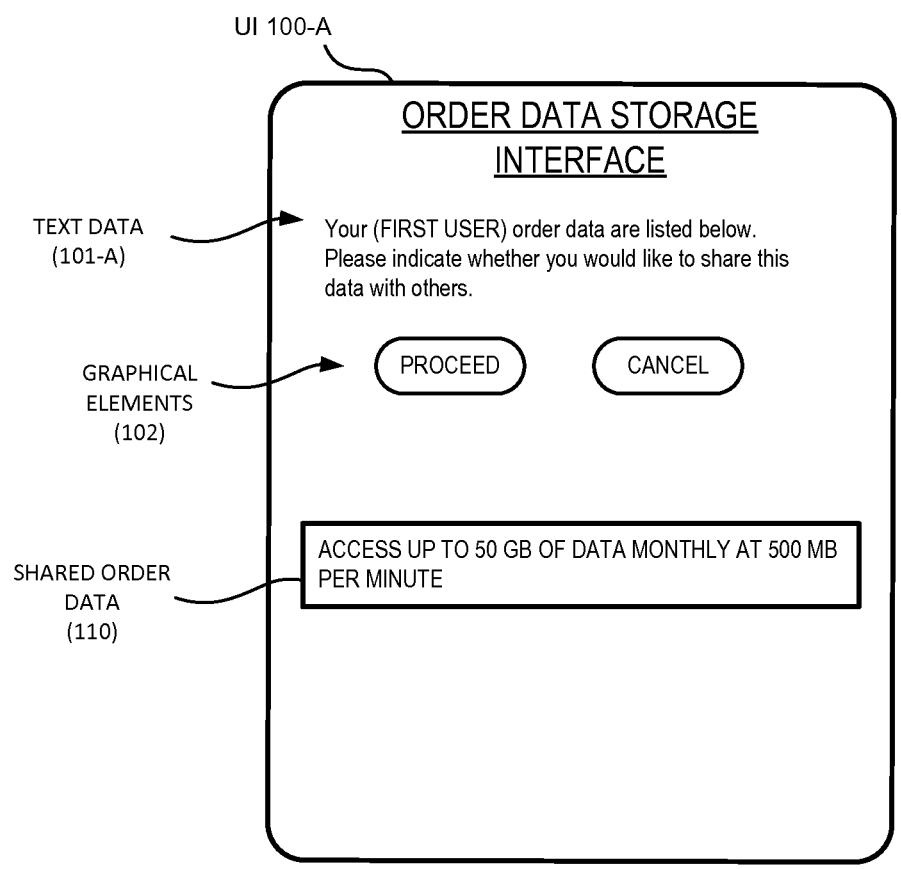

As shown in FIG. 1A, UI 100-A may present an "Order Data Storage Interface." Order Data Storage interface includes text data 101-A that identifies the order settings included in shared order data 110 presented in UI 100-A. Order Data Storage interface prompts the user to indicate whether shared order data 110 should be shared. For example, UI 100-A may include one or more graphical elements 102 that may be selected by the user (e.g., via a mouse click or other user input). In the example shown in FIG. 1A, text data 101-A may prompt the user to select one of the graphical elements 102 (e.g., the "Proceed" element) to form shared order data 110 or to select another graphical element 102 (e.g., the "Cancel" element), to forego forming shared order data 110.

UI 100-A may display shared order data 110 that identifies order settings associated with the user. In the example shown in FIG. 1A, shared order data 110 relates to accessing an amount of data at a particular rate (e.g., "Access up to 50 GB of data monthly at 500 MB per minute"). It should be appreciated, however, that shared order data 110 may relate to settings for any type of service provided to a user and, therefore, may include additional, fewer, and/or different data.

In certain implementations, UI 100-A may be automatically presented (e.g., without a user input), when the user initials orders a good or service or when the user modifies settings associated with a good or service. In this way, shared order data 110 may be generated to reflect new and/or changed account settings.

Shared order data 110 may be manually entered by the user. For example, UI 100-A may correspond to a webpage presenting a form, such as a hypertext markup language (HTML) form (or web form) or an extended markup language (XML) form (or XFORM), that allows a user to enter data identifying order settings, which may be included in shared order data 110. For instance, shared order data 110 may be presented in a text box that is adapted to receive, when selected (e.g., clicked) by a user, textual input from a user via an input device, such as a keyboard or other device. In other instances, UI 100-A may include other types of input interfaces, such as a radio button or check boxes that allow a user to select from different display values/options or a drop-down list that displays a list of selectable items. A user may fill out a form shown in UI 100-A using, for example, the checkboxes, the radio buttons, the drop-down menus, and/or the text fields.

In another example, a user device, such as a computing device, may access locally or remotely stored order settings associated with the user and may populate shared order data 110 with the accessed order settings. UI 100-A may then present the populated shared order data 110. In yet another example, UI 100-A may populate shared order data 110 with stored order setting data and may further enable the user to edit the stored order settings (e.g., remove a portion of the stored order settings, and/or add additional information). For instance, one or more additional graphical elements 102 (not shown) may enable the user to modify stored order data settings. UI 100-A may further enable the user to annotate or otherwise include additional data (e.g., data that are not order settings). For example, the user may add information identifying hardware and/or software used by the user; reviews or commentaries about the shares orders settings; biographical information (e.g., identifying an associated user) and/or contact information associated with the user.

FIG. 1B shows exemplary information that may be included in shared order data 110 according to one implementation. As shown in FIG. 1B, shared order data 110 may include, for example, order settings data 112, user identifying data 114, verification data 116, and/or additional data 118. Some or all of order settings data 112, user identifying data 114, verification data 116, and/or additional data 118 may be presented in UI 100. Other portions of shared order data 110 may not be displayed by UI 100. For example, a portion of shared order data 110 may be embedded or otherwise included in shared order data 110 and the non-displayed portion may be accessed in connection with accessing or otherwise using the displayed portions of shared order data 110. For example, order settings data 112 may be displayed and user identifying data 114, verification data 116, and/or additional data 118 may be used to implement a service settings change.

Order settings data 112 may include information identifying one or more order settings used by a user. For example, as shown in FIG. 1A, order settings data 112, presented in shared order data 110, may identify an amount of data that may be accessed by the user through a service network and a data rate that is available to the user through the service network. In other examples, order settings data 112 may identify other attributes of telecommunications and/or data services settings provided to the user. Additionally or alternatively, order settings data 112 may identify the telecommunications and/or data services settings provided to the user.

User identifying data 114 may include data associated with a user, such as information identifying a first user (e.g., a user associated with order settings data 112), such as a name, telephone number, address, order identifier, etc. User identifying data 114 may also include information associated with hardware/software used by the first user, information identifying a geographic location associated with the first user, etc. Verification data 116 may include information that may be used to verify that shared order data 110 is accurate (e.g., not modified by an unauthorized party and/or damaged in transmission), complete, and/or timely (e.g., includes most recent order settings data 112 or other portions of shared order data 110). For example, verification data 116 may include a hash value, and UI 100 may verify that the contents of shared order data 110 conform to the hash value. In another example, verification data 116 may include encoded information identifying an associated user (e.g., an account number), and this information may be compared with the contents of user identifying data 114 to verify that shared order data 110 accurately identifies the associated user.

Additional data 118 may include other information associated with order settings data 112 or other portions of shared order data 110. For example, additional data 118 may include performance metrics associated with the listed order settings; cost estimates for the second user to use the first user's order settings; instructions for the second user to copy the first user's order settings; alternative order settings that are available to the second user; shared order data 110 associated with another user; information identifying other users adopting the order settings; feedback (e.g., reviews) from the other users adopting the order settings; etc.

In one implementation, additional data 118 may include code that initiates a process for modifying order settings to copy or otherwise modify a second user's order settings based on order settings data 112. For example, additional data 118 may initiate an interface for implementing a service change, as described in greater detail below with respect to FIGS. 1E and 1F.

In one implementation, additional data 118 may include data that may be used to verify that shared order data 110 is associated with a first user. For example, at least a portion of shared order data 110 may be encrypted using an encryption key associated with the first user, and additional data 118 may include a decryption key that may be used to decrypt the encrypted portion of shared order data 110.

Figure 1C:
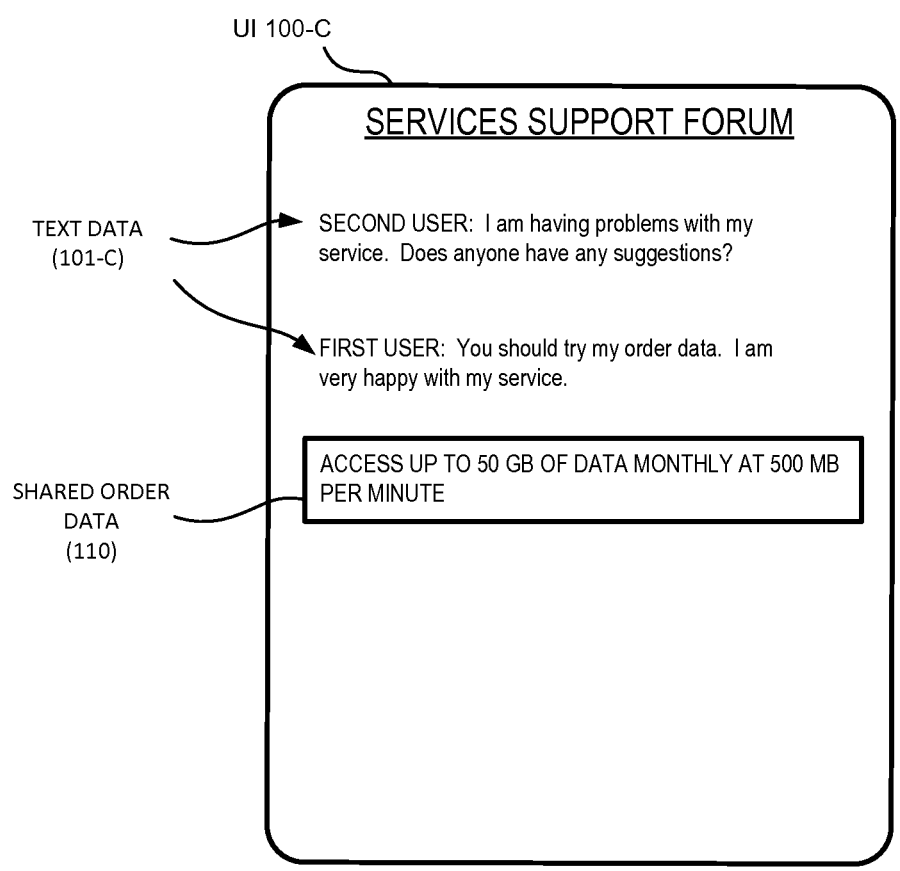

A user may forward her shared order data 110 to another user, and the other user may use the shared order data 110 to copy or otherwise modify her services based on settings identified in shared order data 110. As shown in FIG. 1C, the user may forward shared order data 110 to the other user through an online forum (e.g., a "Service Support Forum") in which a user may include shared order data 110 in a posted message. In the specific example shown in FIG. 1C, UI 100-C includes text data 102-C that indicates that the other user (e.g., a "second user" in FIGS. 1A and 1C-1E) is soliciting advice regarding services. In exemplary text data 101-C in FIG. 1C, the user generating shared order data 110 (e.g., a "first user" in FIGS. 1A and 1C-1E) recommends her order settings as identified in shared order data 110. In this example, shared order data 110 may include an indication (e.g., text data) identifying the order settings used by the first user. As described above with respect to FIG. 1B, shared order data 110 may further include different, additional, and or fewer information that may be presented within UI 100-C.

Although shown in as a service forum for receiving and posting text data 101-C from the first and second users, it should be appreciated that UI 100-C may include other mechanisms and/or content for presenting shared order data 110. For example, the first user may also forward shared order data 110 via a message, such as an e-mail or a short messaging service (SMS) message, such an instant message. In another example, the first user may also distribute shared order data 110 via a social media or other website. In this way, the first user may forward, as shared order data 110, order settings to the second user with minimum manual input and with a minimal likelihood of an entry error, and the second user may copy and use shared order data 110 with minimum manual input. Furthermore, UI 100 may verify that shared order data 110 is associated with the first user.

In the implementation shown in FIG. 1C, UI 100-C may present at least a portion of shared order data 110. For example, UI 100-C may parse shared order data 110 and may extract (or otherwise obtain) and display order settings data 112. In another example shown in FIG. 1D, UI 100-D may present a link 120 that includes a storage address, code, or other data that may be used by the second user or another party to access shared order data 110. Additionally or alternatively, selection of link 120 (e.g., by a user input) may initiate a process to modify the second user's service settings based on shared order data 110.

Figure 1E:
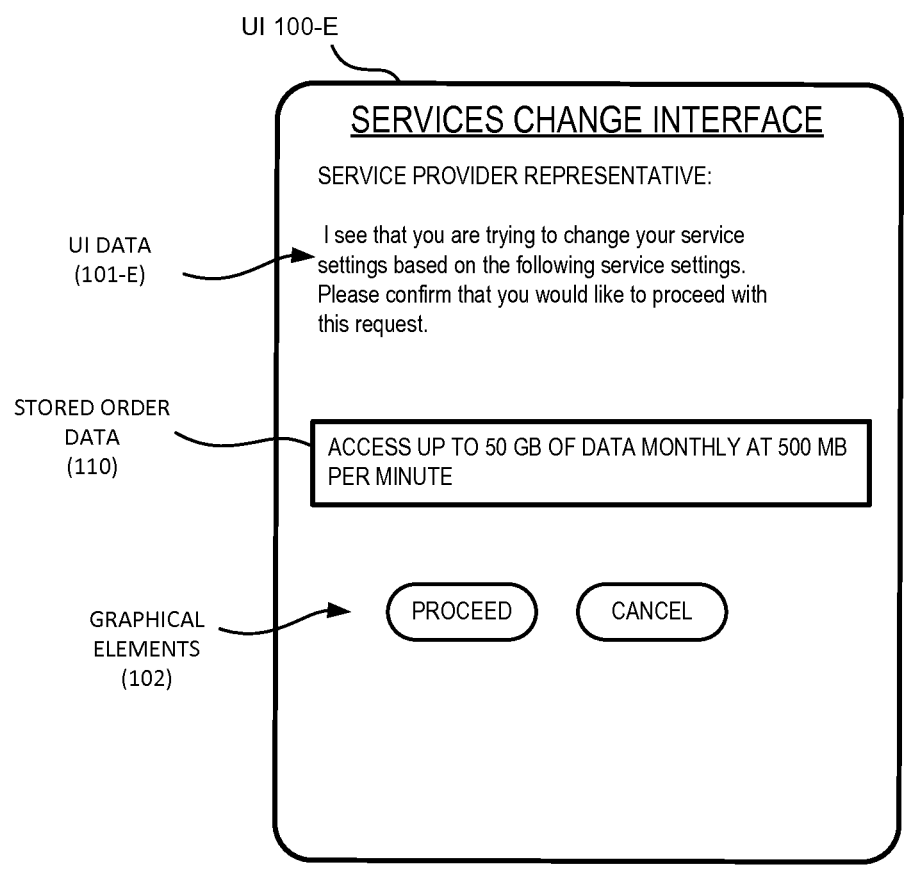

For example, selection of link 120 may initiate UI 100-E, shown in FIG. 1E. UI 100-E may include text data 101-E and/or graphical elements 102 that enable the second user to clone service settings included in or otherwise associated with shared order data 110. For example, UI 100-E may present at least a portion of shared order data 110 (e.g., order settings data 112) and may prompt the second user to submit an input to proceed with copying the first user's order settings. In one implementation, UI 100-E may present multiple different order settings associated with the user and may further enable the second user to manually select one or more of the order settings in shared order data 110 to adopt. For example, UI 100-E may enable the second user to select one or more graphical elements 102 (not shown) to specify the one or more of the order settings in shared order data 110 to be adopted.

Figure 1F:
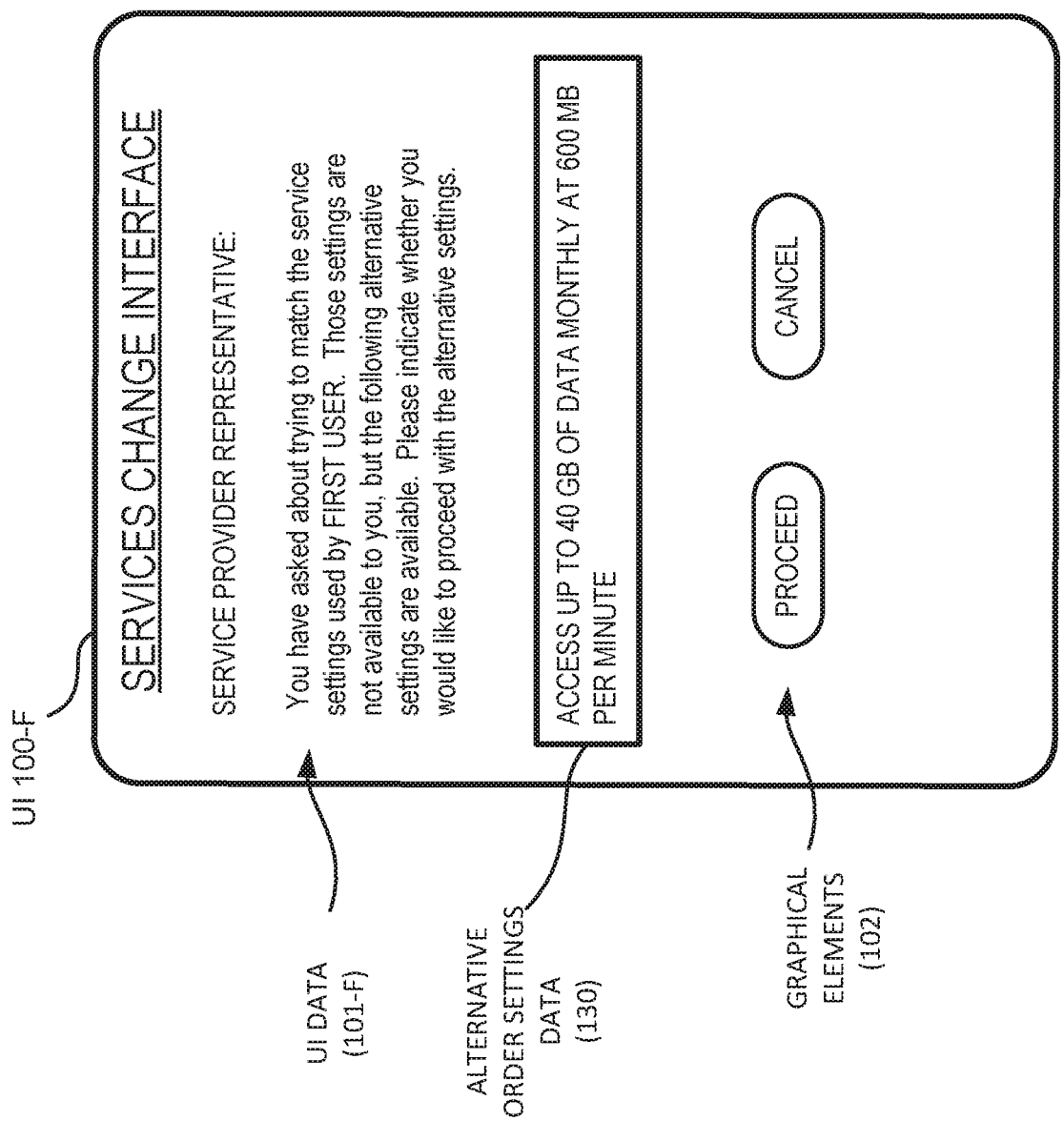

In another example shown in FIG. 1F, UI 100-F may present alternative order settings data 130 that may be selected by the second user. Alternative order settings data 130 may correspond to order settings that are available to the second user. For example, UI 100-F may present alternative order settings data 130 if settings identified in shared order data 110 (e.g., order settings data 112) are unavailable to the second user. For example, the particular order settings may not be applicable to services used by the second user and/or are not applicable to the hardware/software associated with the second user. In another instance, the service settings identified in shared order data 110 (e.g., order settings data 112) may be unavailable in a geographic region associated with the second user and/or a customer type associated with the second user. In another example, UI 100-F may present alternative order settings data 130 when the settings identified in shared order data 110 (e.g., order settings data 112) are available to the second user, but UI 100 determines that "better" order settings options are available to the second user (e.g., the second user is eligible to receive a higher level of service at a similar or lower cost). In another implementation, UI 100-F may present alternative order settings data 130 based on receiving a user input (e.g., selection of a graphical element 102 not shown in FIG. 1E or 1F) requesting different available service setting options.

As shown in FIG. 1F, UI 100-F may include text data 100-F that includes an indication that alternative order setting data 130 is being presented. Text data 100-F may further prompt the second user to submit a particular input (e.g., select a graphical element 102) to confirm an acceptance of alternative order setting data 130.

FIGS. 1A and 1C-1F depict exemplary components of UI 100 according to one implementation. In other implementations, UI 100 may include fewer components, additional components, different components, or differently arranged components than illustrated in FIGS. 1A and 1C-1F. Furthermore, one or more components of UI 100 may perform one or more tasks described as being performed by one or more other components of UI 100.

FIG. 2 shows an exemplary environment 200 in which systems and/or methods described herein may be implemented. As shown in FIG. 2, environment 200 may include a settings reporting device 210, a first user device 220, a backend device 230, a network 240 and a second user device 250.

Settings reporting device 210 may generate shared order data 110. For example, settings reporting device 210 may receive a sharing request 201 from first user device 220 to generate shared order data 110 associated with first user device 220. For example, as described above with respect to FIG. 1A, settings reporting device 210 may receive, via UI 100-A, confirmation that a first user desires generation of shared order data 110. Sharing request 201 may further include, for example, information identifying first user device 220 and/or an associated user, information describing one or more features (e.g., hardware and/or software) associated with first user device 220, order settings data 112 reported by first user device 220, information identifying second user 250, etc.

In one implementation, settings reporting device 210 may examine sharing request 201 to verify that it is generated by and/or received from first user device 220. For example, settings reporting device 210 may parse sharing request 201 to identify information associated with first user device 220, such as a network address (e.g., a media access control (MAC) address or an internet protocol (IP) address), a network identifier (e.g., a mobile equipment identifier (MEID), a telephone number, etc.), an account number, a user name or other user attribute, etc. Settings reporting device 210 may verify that information extracted from sharing request 201 accurately identifies first user device 220. For example, settings reporting device 210 may verify that a network address for first user device 220, included in sharing request 201, matches a source address for sharing request 201. In another example, settings reporting device 210 may interact with another device (e.g., backend device 230) to verify that information extracted from sharing request 201 is accurate with respect to first user device 220. For example, settings reporting device 210 may verify with backend device 230 that a user identifier and/or order data extracted in sharing request 201 is accurate for first user device 220.

In one implementation, settings reporting device 210 may use information included in sharing request 201 to obtain at least a portion of shared order data 110 from another device, such as backend device 230. For example, settings reporting device 210 may extract a user name, an account number, etc. from sharing request 201, and settings reporting device 210 may use this information to obtain settings data 202. For example, settings data 202 may reflect a most recent and/or current order settings data 112 associated with first user device 220. In another example, settings data 202 may identify services received by first user device 220 or a related device (e.g., another device associated with the same user). In one instance, settings reporting device 210 may use information included in sharing request 201 to obtain at least a portion of shared order data 110 from another device associated with the user of first user device 220. For example, settings reporting device 210 may determine, from sharing request 201, an address associated with the other device, and may contact the other device using the obtained address to acquire the portion of shared order data 110.

In another implementation, settings reporting device 210 may identify settings data from first user device 220 and/or a related device (e.g., another device associated with a user for first user device 220). For example, settings reporting device 210 may determine, based on sharing request 201, another device associated with the user (e.g., another user device, set-top box, computing device, gaming device, etc.). Settings reporting device 210 may communicate with the other device associated with the user to obtain settings data 202 used by the other device, even if settings data 202 does not relate to the operation of first user device 220.

Settings reporting device 210 may generate shared order data 110 based on the contents of sharing request 201 and/or settings data 202. For example, as described above with respect to FIG. 1B, settings reporting device 210 may generate shared order data 110 that includes, for example, order settings data 112, user identifying data 114, verification data 116, and/or additional data 118. Settings reporting device 210 may then forward shared order data 110 to first user device 220 so that first user device 220 may distribute shared order data 110 to second user device 250 (e.g., via interface 100 as described above with respect to FIG. 1C) or directly to second user device 250.

In another implementation, settings reporting device 210 may store at least a portion of shared order data 110 to shared order data storage 212. As described above with respect to FIG. 1D, settings reporting device 210 may then distribute a link to the stored portion of shared order data 110. For instance, the link may identify a portion of shared order data storage 212 storing shared order data 110.

In one implementation, settings reporting device 210 may include, in shared order data 110, data that associates shared order data 110 with first user device 220. For example, at least a portion of shared order data 110 may be encrypted using an encryption key associated with first user device 220. For example, first user device 220 may forward the encryption key to settings reporting device 210 and may forward the decryption key to second user device 250. In this way, only second user device 250 may determine the contents of shared order data 110 (e.g., first user device 220 may limit access to shared order data), and second user device 250 may verify that the contents of shared order data 110 are associated with first user device 220.

Each of first user device 220 and second user device 250 may be capable of receiving, processing, and providing information (e.g., to present interface 100). For example, each of first user device 220 and second user device 250 may include a mobile phone (e.g., a smart phone, a radiotelephone, etc.), a computing device (e.g., a laptop computer, a tablet computer, a handheld computer, etc.), or a similar device. In some implementations, each of first user device 220 and second user device 250 may include a communication interface that allows each of first user device 220 and second user device 250 to receive information from and/or transmit information to backend device 230 and/or another device in environment 200.

Backend device 230 may include one or more devices for supporting services provided to first user device 220. For example, backend device 230 may include an authentication server for authenticating credentials, such as order names and/or passwords of a user associated with first user device 220, and may provide, based on authenticating the credentials, a set of credentials that may be used by first user device 220 to access various services. In another example, backend device 230 may include a billing server for monitoring use of services by first user device 220 and may determine billing information associated with the use of the services. In still another example, backend device 230 may include a data server for providing data to first user device 220, such as information that may be used by first user device 220 to access a service. In some implementations, backend device 230 may include a communication interface that allows backend device 230 to receive information from and/or transmit information to other devices in environment 200.

Network 240 may include one or more wired and/or wireless networks. For example, network 240 may include a cellular network, a public land mobile network ("PLMN"), a second generation ("2G") network, a third generation ("3G") network, a fourth generation ("4G") network, a fifth generation ("5G") network, a long term evolution ("LTE") network, and/or a similar type of network. Additionally, or alternatively, network 240 may include a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, and/or a combination of these or other types of networks.

The number of devices and/or networks shown in FIG. 2 is provided for explanatory purposes. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by one or more other devices of environment 200. For instance, settings reporting device 210 may be integrated into an application and/or component of first user device 220. Devices of environment 200 may be interconnected via wired connections, wireless connections, or a combination of wired and wireless connections.

Figure 3:
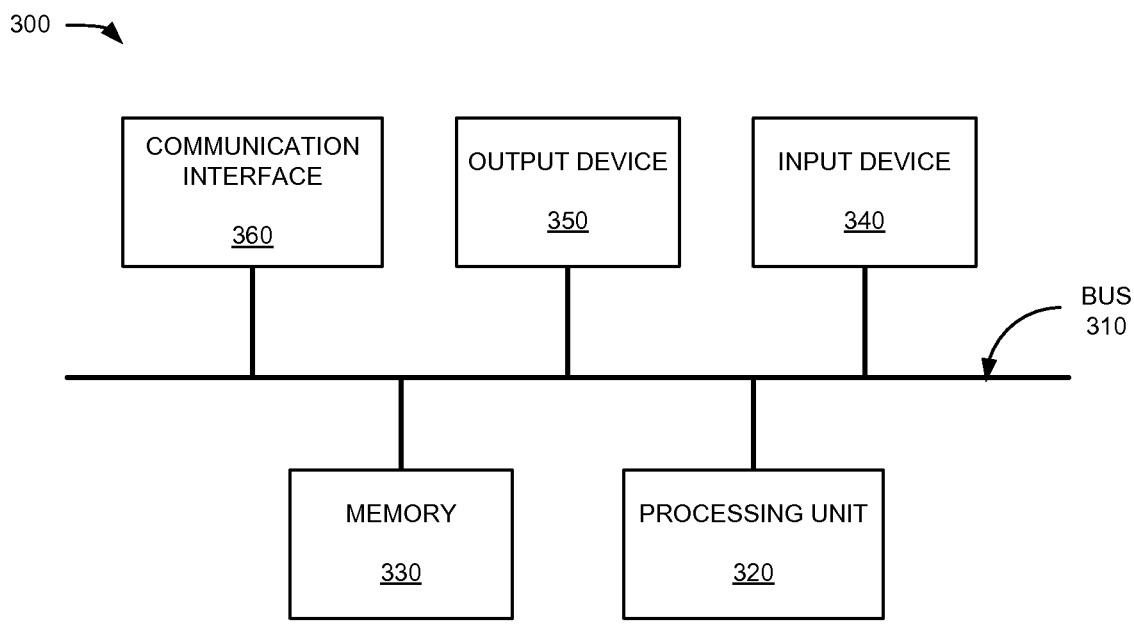
FIG. 3 shows a diagram of exemplary components that may be included in a computing device in the environment shown in FIG. 2.

FIG. 3 is a schematic diagram illustrating exemplary components of a computing device 300. Each of settings reporting device 210, first user device 220, backend device 230, a component of network 240, and/or second user device 250 may each include one or more computing devices 300. As shown in FIG. 3, computing device 300 may include a bus 310, a processing unit 320, a memory 330, an input device 340, and output device 350, and a communication interface 360.

Bus 310 may include a path that permits communication among the components of computing device 300. Processing unit 320 may include a processor, a microprocessor, or processing logic that may interpret and execute instructions. Memory 330 may include any type of dynamic storage device that may store information and instructions, for execution by processing unit 320, and/or any type of non-volatile storage device that may store information for use by processing unit 320. Input device 340 may include a mechanism that permits a user to input information to computing device 300, such as a keyboard, a keypad, a button, a switch, etc. Output device 350 may include a mechanism that outputs information to user, such as a display (e.g., a liquid crystal display, a light emitting diodes (LED) based display, etc.), a speaker, etc.

Communication interface 360 may include any transceiver that enables computing device 300 to communicate with other devices and/or systems via wireless communications, wired communications, or a combination of wireless and wired communications. For example, communication interface 360 may include mechanisms for communicating with another device or system via a network. Communication interface 360 may include an antenna assembly for transmission and/or reception of radio-frequency (RF) signals. For example, communication interface 360 may include one or more antennas to transmit and/or receive RF signals over the air. In one implementation, for example, communication interface 360 may communicate with a network and/or devices connected to a network. Alternatively or additionally, communication interface 360 may be a logical component that includes input and output ports, input and output systems, and/or other input and output components that facilitate the transmission of data to other devices.

Computing device 300 may perform certain operations in response to processing unit 320 executing software instructions contained in a computer-readable medium, such as memory 330. A computer-readable medium may be defined as a non-transitory memory device. A memory device may include space within a single physical memory device or spread across multiple physical memory devices. The software instructions may be read into memory 330 from another computer-readable medium or from another device. The software instructions contained in memory 330 may cause processing unit 320 to perform processes described herein. Alternatively, hardwired circuitry may be used in place of or in combination with software instructions to implement processes described herein. Thus, implementations described herein are not limited to any specific combination of hardware circuitry and software.

Computing device 300 may include fewer components, additional components, different components, and/or differently arranged components than those illustrated in FIG. 3.

Furthermore, one or more components of computing device 300 may perform one or more tasks described as being performed by one or more other components of computing device 300.

Figure 4:
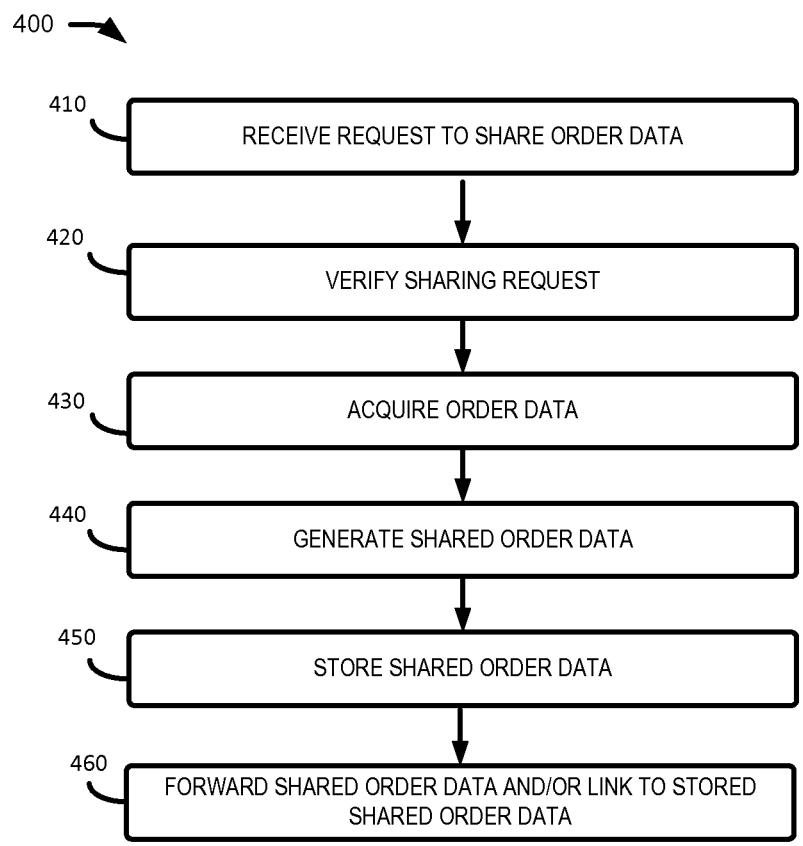
FIG. 4 shows a flow diagram illustrating an exemplary process for generating and distributing the shared order data shown in FIG. 1B.

FIG. 4 is a flow diagram illustrating an exemplary process 400 for providing shared order data 110. In some implementations, process 400 may be performed by settings reporting device 210. In other implementations, process 400 may be performed by one or more other devices of environment 200, such as first user device 220, backend device 230 and/or second user device 250. For instance, process 400 may be performed by an application and/or component of first user device 220.

As shown in FIG. 4, process 400 may include receiving a sharing request 301 (block 410). Settings reporting device 210 may generate shared order data 110. For example, settings reporting device 210 may receive a sharing request 201 from first user device 220 to generate shared order data 110 associated with first user device 220. For example, as described above with respect to FIG. 1A, settings reporting device 210 may receive, via UI 100-A, confirmation that a first user desires generation of shared order data 110. Sharing request 201 may further include, for example, information identifying first user device 220 and/or an associated user, information describing one or more features (e.g., hardware and/or software) associated with first user device 220, order settings data 112 reported by first user device 220, information identifying second user 250, etc.

As shown in FIG. 4, process 400 may also include verifying sharing request 201 (block 420). For example, settings reporting device 210 may parse sharing request 201 to identify information associated with first user device 220, such as a network address (e.g., a media access control (MAC) address or an internet protocol (IP) address), a network identifier (e.g., a mobile equipment identifier (MEID), a telephone number, etc.), an account number, a user name or other user attribute, etc. Settings reporting device 210 may verify that information extracted from sharing request 201 accurately identifies first user device 220. For example, settings reporting device 210 may verify that a network address for first user device 220, included in sharing request 201, matches a source address for sharing request 201. In another example, settings reporting device 210 may interact with another device (e.g., backend device 230) to verify that information extracted from sharing request 201 is accurate with respect to first user device 220. For example, settings reporting device 210 may verify with backend device 230 that a user identifier and/or order data extracted in sharing request 201 is accurate for first user device 220.

As shown in FIG. 4, process 400 may further include acquiring settings data 202 (block 430). For example, settings reporting device 210 may use information included in sharing request 201 to obtain at least a portion of shared order data 110 from another device, such as backend device 230. For example, settings reporting device 210 may extract a user name, an account number, etc. from sharing request 201, and settings reporting device 210 may use this information to obtain settings data 202. For example, settings data 202 may reflect a most recent and/or current order settings data 112 associated with first user device 220. In another example, settings data 202 may identify services received by first user device 220 or a related device (e.g., another device associated with the same user). In one instance, settings reporting device 210 may use information included in sharing request 201 to obtain at least a portion of shared order data 110 from another device associated with the user of first user device 220. For example, settings reporting device 210 may determine, from sharing request 201, an address associated with the other device, and may contact the other device using the obtained address to acquire the portion of shared order data 110.

As shown in FIG. 4, process 400 may include generating shared order data 110 (block 440). Settings reporting device 210 may generate shared order data 110 based on the contents of sharing request 201 and/or settings data 202. For example, as described above with respect to FIG. 1B, settings reporting device 210 may generate shared order data 110 that includes, for example, order settings data 112, user identifying data 114, verification data 116, and/or additional data 118. Settings reporting device 210 may then forward shared order data 110 to first user device 220 so that first user device 220 may distribute shared order data 110 to second user device 250 (e.g., via interface 100 as described above with respect to FIG. 1C).

As shown in FIG. 4, process 400 may include storing shared order data 110 (block 450) and forwarding the shared order data 110 and/or a link to shared order data 110 (block 460). For example, settings reporting device 210 may store at least a portion of shared order data 110 to shared order data storage 212. As described above with respect to FIG. 1C, settings reporting device 210 may forward shared order data 110 to first user device 220, and first user device 220 may distribute shared order data 110 to second user device 250 via a message, web site, etc. Alternatively or additionally, as described above with respect to FIG. 1D, settings reporting device 210 may distribute a link to the stored portion of shared order data 110. For instance, the distributed link may identify a portion of shared order data storage 212 storing shared order data 110.

FIG. 5 is a flow diagram illustrating an exemplary process 500 for modifying order settings in second user device 250 based on shared order data 110 associated with first user device 220. In one implementation, process 500 may be implemented by backend device 230. In other implementations, process 500 may be performed by one or more other devices of environment 200, such as second user device 250.

As shown in FIG. 5, process 500 may include receiving shared order data 110 (block 510) and identifying order settings data 112 associated with shared order data 110 (block 520). For example, second user device 250 may use shared order data 110 associated with first user device 220 to modify one or more settings. For example, backend device 230 may parse shared order data 110 to determine order settings data 112. In another example, backend device 230 may use information included in shared order data 110 (e.g., information identifying first user device 220 and/or an associated user, a link to shared order data storage 212, etc. to obtain order settings data 112 from another device.

As shown in FIG. 5, process 500 may also include determining whether order settings data 112 identified in or otherwise obtained via shared order data 110, is applicable to second user device 250 (block 530). For example, backend device 230 may determine whether the settings used by first user device 220 are available to second user device 250 (e.g., whether the settings are available to a device type of second user device 250) and/or to an associated user (e.g., whether the settings are available in a geographic region and/or a customer type associated with the user of second user device 250). If the settings of shared order data 110 are available to the second user device 250 (block 530—Yes), backend device 230 may enable or otherwise change the order settings for second user device 250 to match shared order data 110 (block 540). For example, backend device 230 may modify settings associated with second user device 250 to match settings used by first user device 220.

Otherwise, if the settings of shared order data 110 are not available to the second user device 250 (block 530-No), backend device 230 may identify alternative order settings available to the second user device 250 (block 550). For example, backend device 230 may form various services vectors $V_i\{s_{i1}, s_{i2}, \ldots, s_{in}\}$, where $s_{i1}, s_{i2}, \ldots, s_{in}$ represent different service settings available to second user device 250, and backend device 230 may identify a particular vector $V_i$ that is closest in vector distance to a services vector $V_k$ associated with first user device 220, as identified in shared order data 110. Additionally or alternatively, backend device 230 may select a set of service settings for second user device 250 based on other criteria, such as minimizing changes in the service settings for second user device 250, reducing or minimizing costs to second user device, maximizing one or more performance criteria (e.g., bandwidth), etc. Backend device 230 may enable or otherwise change the alternative order settings for second user device 250 (block 560). For example, as described above with respect to FIG. 1F, UI 100-F may present one or more alternative order settings data 130, and prompt the second user whether to accept alternative order settings data 130. If the second user accepts the alternative settings, backend device 230 may modify settings associated with second user device 250 to match alternative order settings data 130.

Various preferred embodiments have been described herein with reference to the accompanying drawings. However, it will be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while a series of blocks has been described with respect to FIGS. 4 and 5, the order of the blocks in processes 400 and 500 may be modified in other implementations. Furthermore, non-dependent blocks may be performed in parallel. Furthermore, processes 400 and 500 may include additional and/or fewer blocks than shown in FIGS. 4 and 5.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that different aspects of the description provided above may be implemented in many different forms of software, firmware, and hardware in the implementations illustrated in the figures. The actual software code or specialized control hardware used to implement these aspects is not limiting of the implementations. Thus, the operation and behavior of these aspects were described without reference to the specific software code—it being understood that software and control hardware can be designed to implement these aspects based on the description herein.

What is claimed is:

1. A method comprising:
receiving, by a processor, a first request from a first user device for service setting data applicable to the first user device for a first user account, wherein the service setting data enables access to at least one of network telecommunications or data service via a service network, wherein the service setting data corresponds to a services vector $V_k$;
sending, by the processor and based on receiving the first request, the service setting data to the first user device, wherein the service setting data includes instructions to generate a user interface at a second user device;
receiving, by the processor and based on the first user device sharing the service setting data with the second user device, a second request from the second user device via the user interface to enable access to the at least one of network telecommunications or data service via the service network for a second user account according to the service setting data;
determining, by the processor, that the access cannot be enabled for the second user device based on at least one of a geographic location or a device type associated with the second user device;
generating, by the processor based on the determination, multiple services vectors $V_i\{s_{i1} \ldots s_{in}\}$, wherein $s_{in}$ corresponds to a service setting available to the second user device to access the at least one of network telecommunications or data service via the service network;
identifying, by the processor, for each one of the multiple services vectors, $V_i$, a vector distance to services vector $V_k$;
determining, by the processor, an amount of change that each service setting of the multiple service vectors, $V_i$, represents relative to current service settings applicable to the second user device;
selecting, by the processor, an alternative service setting dataset based on the identified vector distances and to minimize the amounts of change to the current service settings, and wherein the alternative service setting dataset corresponds to a minimal cost under the second user account and maximizes bandwidth and at least one other network performance criteria of the service network for the at least one of network telecommunications or data service;
identifying, by the processor and based on the second request, a third user device associated with the first user account;
communicating, by the processor, with the third user device to obtain other service setting data used by the third user device to enable the third user device to access the at least one of network telecommunications or data service, wherein the other service setting data does not relate to operation of the first user device;
forwarding, by the processor, the alternative service setting dataset and the other service setting data to the second user device; and
applying, to the second user device, the alternative service setting dataset and the other service setting data to enable access to the at least one of network telecommunications or data service via the service network.

2. The method of claim 1, further comprising:
determining that access to the at least one of network telecommunications or data service according to the service setting data cannot be enabled for the second user device based on the geographic location and the device type.

3. The method of claim 1, wherein maximizing the at least one performance criteria comprises maximizing an amount of data available via the at least one of network telecommunications or data service by the second user device.

4. The method of claim 1, wherein forwarding the alternative service setting dataset includes:
storing data associated with the alternative service setting dataset to a memory;
and including, in the alternative service setting dataset, a link to the stored data.

5. The method of claim 1, wherein
forwarding the alternative service setting dataset includes sending a prompt to the second user device to accept the alternative service setting dataset.

6. The method of claim 1,
wherein the third user device comprises at least one of a set-top-box or a gaming device.

7. The method of claim 1, further comprising:
encrypting the alternative service setting dataset using encryption data associated with the first user device; and
forwarding decryption data to the second user device, wherein the decryption data enables the second user device to decrypt the encrypted alternative service setting dataset.

8. A device comprising:
a communication interface;
a memory configured to store instructions; and
a processor configured to execute the instructions to:
receive, via the communication interface, a request from a first user device for service setting data applicable to the first user device for a first user account, wherein the service setting data enables access to at least one of network telecommunications or data service via a service network, wherein the service setting data corresponds to a services $V_k$;
send, based on receiving the request, the service setting data to the first user device, wherein the service setting data includes instructions to generate a user interface at a second user device;
receive, based on the first user device sharing the service setting data with the second user device, a request from the second user device via the user interface to enable access to the at least one of network telecommunications or data service via the service network for a second user account according to the service setting data;
determine that the access cannot be enabled for the second user device based on at least one of a geographic location or a device type associated with the second user device;
generate, based on the determination, multiple services vectors $V_i\{s_{i1} \ldots s_{in}\}$, wherein $s_{in}$ corresponds to a service setting available to the second user device to access the at least one of network telecommunications or data service via the service network;
identify, for each one of the multiple services vectors, $V_i$, a vector distance to services vector $V_k$;
determine an amount of change that each service setting of the multiple service vectors, $V_i$, represents relative to current service settings applicable to the second user device;
select an alternative service setting dataset based on the identified vector distances and to minimize the amounts of change to the current service settings, and wherein the alternative service setting dataset corresponds to a minimal cost under the second user account and maximizes bandwidth and at least one other network performance criteria of the service network for the at least one of network telecommunications or data service;
identify, based on the second request, a third user device associated with the first user account;
communicate with the third user device to obtain other service setting data used by the third user device to enable the third user device to access the at least one of network telecommunications or data service, wherein the other service setting data does not relate to operation of the first user device;
forward, via the communication interface, the alternative service setting dataset and the other service setting data to the second user device; and
apply, to the second user device, the alternative service setting dataset and the other service setting data to enable access to the at least one of network telecommunications or data service via the service network.

9. The device of claim 8, wherein the processor, when executing the instructions, is further configured to:
determine that access to the at least one of network telecommunications or data service according to the service setting data cannot be enabled for the second user device based on the geographic location and the device type.

10. The device of claim 8, wherein maximizing the at least one other performance criteria comprises maximizing an amount of data available via the at least one of network telecommunications or data service by the second user device.

11. The device of claim 8, wherein the processor, when executing the instructions to forward the alternative service setting dataset, is further configured to:
store data associated with the alternative service setting dataset; and
include a link to the stored data.

12. The device of claim 8, wherein when forwarding the alternative service setting dataset the processor is further configured to:
send a prompt to the second user device to accept the alternative service setting dataset.

13. The device of claim 8, wherein the third user device comprises at least one of a set-top-box or a gaming device processor.

14. The device of claim 8, wherein the processor, when executing the instructions, is further configured to:
encrypt the alternative service setting dataset using encryption data associated with the first user device; and
forward decryption data to the second user device, wherein the decryption data enables the second user device to decrypt the encrypted alternative service setting dataset.

15. A non-transitory computer-readable medium to store instructions that, when executed by a processor, cause the processor to:
receive a request from a first user device for service setting data applicable to the first user device for a first user account, wherein the service setting data enables access to at least one of network telecommunications or data service via a service network, wherein the service setting data corresponds to a services vector $V_k$;
send, based on receiving the request, the service setting data to the first user device, wherein the service setting data includes instructions to generate a user interface at a second user device;

receive, based on the first user device sharing the service setting data with the second user device, a request from the second user device via the user interface to enable access to the at least one of network telecommunications or data service via the service network for a second user account according to the service setting data;

determine that the access cannot be enabled for the second user device based on at least one of a geographic location or a device type associated with the second user device;

generate, based on the determination, multiple services $V_i\{s_{i1} \ldots s_{in}\}$, wherein $s_{in}$ corresponds to a service setting available to the second user device to access the at least one of network telecommunications or data service via the service network;

identify, for each one of the multiple services vectors, Vi, a vector distance to services determine an amount of change that each service setting of the multiple service vectors, Vi, represents relative to current service settings applicable to the second user device;

select an alternative service setting dataset based on the identified vector distances and to minimize the amounts of change to the current service settings, and wherein the alternative service setting dataset corresponds to a minimal cost under the second user account and maximizes bandwidth and at least one other network performance criteria of the service network for the at least one of network telecommunications or data service;

identify, based on the request, a third user device associated with the first user account;

communicate with the third user device to obtain other service setting data used by the third user device to enable the third user device to access the at least one of network telecommunications or data service, wherein the other service setting data does not relate to operation of the first user device;

forward the alternative service setting dataset to the second user device; and apply, to the second user device, the alternative service setting dataset and the other service setting data to enable access to the at least one of network telecommunications or data service via the service network.

16. The non-transitory computer-readable medium of claim 15, wherein the instructions further cause the processor to:

determine that access to the at least one of network telecommunications or data service according to the service setting data cannot be enabled for the second user device based on the at least one of the geographic location and the device type.

17. The non-transitory computer-readable medium of claim 15, wherein the instructions to maximize the at least one other performance criteria comprise instructions to maximize an amount of data available via the at least one of network telecommunications or data service by the second user device.

18. The non-transitory computer-readable medium of claim 15, wherein the instructions further cause the processor, when forwarding the alternative service setting dataset, to:

store data associated with the alternative service setting dataset; and include a link to the stored data.

19. The non-transitory computer-readable medium of claim 15, wherein the instructions further cause the processor to:

send a prompt to the second user device to accept the alternative service setting dataset.

20. The non-transitory computer-readable medium of claim 15, wherein the instructions further cause the processor to:

encrypt the alternative service setting dataset using encryption data associated with the first user device; and forward decryption data to the second user device, wherein the decryption data enables the second user device to decrypt the encrypted alternative service setting dataset.

* * * * *